United States Patent [19]
Ende

[11] Patent Number: 4,795,401
[45] Date of Patent: Jan. 3, 1989

[54] TRUNNION CROSS

[75] Inventor: Eberhard Ende, Essen, Fed. Rep. of Germany

[73] Assignee: Gelenkwellenbau GmbH, Essen, Fed. Rep. of Germany

[21] Appl. No.: 47,940

[22] Filed: May 6, 1987

[30] Foreign Application Priority Data

May 12, 1986 [DE] Fed. Rep. of Germany ....... 3615929

[51] Int. Cl.$^4$ .............................................. F16D 3/41
[52] U.S. Cl. ....................... 464/14; 138/42; 464/136
[58] Field of Search ............... 138/42, 43; 464/11, 464/14, 136

[56] References Cited

U.S. PATENT DOCUMENTS 2,323,115  6/1943  Bryant ................................... 138/43
4,506,423  3/1985  Nakamura et al. ................. 138/42 X

FOREIGN PATENT DOCUMENTS 2721706  11/1977  Fed. Rep. of Germany .
3300376   7/1983  Fed. Rep. of Germany .
385767    6/1973  U.S.S.R. ................................ 464/14

Primary Examiner—Daniel P. Stodola
Attorney, Agent, or Firm—Toren, McGeady & Associates

[57] ABSTRACT

A trunnion cross for connecting two yokes. The trunnion cross includes two pairs of trunnions, wherein each pair is located diametrically opposite each other and extends along an axis, wherein the two axes of the trunnion pairs extend perpendicularly to each other. Each trunnion is received in a roller bearing mounted in an eye of the yoke. The trunnion cross defines two throughbores extending perpendicularly to each other. Cylindrical throttle inserts are inserted in the throughbores for pressure redcution. A thread is formed on the outer circumference of each throttle insert defining a throttle passage. The throttle inserts ensure a uniform reduction of the lubricant pressure within the trunnion cross toward all four trunnion bearing. The danger of a clogging of a lubricant duct by dirt particles is reduced. Any plugs formed by hardening lubricant which cause clogging of a lubricant duct can be ejected.

6 Claims, 3 Drawing Sheets

TRUNNION CROSS

BACKGROUND OF THE INVENTION

1. Field of the Invention

The present invention relates to a trunnion cross used for connecting two yokes via four trunnions which are arranged in two pairs on the trunnion cross. The trunnions of each pair of the trunnions are located diametrically opposite each other and each pair of the trunnions defines an axis, wherein the two axes of the trunnions extend perpendicularly to each other. Each yoke defines a pair of eyes receiving a roller bearing each. The trunnions are adapted for mounting in the roller bearings. The trunnion cross defines two throughbores extending in the direction of the two axes. Throttle inserts are inserted in the throughbores for pressure reduction.

2. Description of the Prior Art

German Offenlegungsschrift 27 21 706 discloses a trunnion cross in which, for improving the lubricant distribution, inserts are inserted into the bores provided for the lubricant which inserts effect a pressure reduction of the lubricant. The throttle device provided in accordance with this prior art reference is a disk which defines a bore having a very small diameter of approximately 0.8 mm.

A throttle bore of such a small size is necessary because of the small axial length of the throttle member provided in the above-mentioned German reference. The small diameter of the throttle bore has the disadvantage that it is easily clogged by dirt particles which may be present in the lubricant. For this reason, a separate filter disk is provided by means of which any dirt particles are retained, so that they do not reach the throttle disk. In the prior art reference, the throttle disk is called a baffle plate or stop disk.

The throttle device according to the prior art reference has the particular disadvantage that over the long term it is possible that the bores of the filter disk will also be clogged. In addition, the entire throttle device is very complicated. Also, since the throttle device requires a substantial amount of space, it can hardly be used in small trunnion crosses.

It is, therefore, the primary object of the present invention to provide a throttle device in a trunnion cross which ensures a uniform reduction of the lubricant pressure toward all four trunnion bearings, while avoiding the danger of clogging of a through passage by dirt particles. In addition, it should be possible to eject any plugs which are formed by hardening lubricant and which may cause clogging of a lubricant passage.

SUMMARY OF THE INVENTION

In accordance with the present invention, this object is met in a trunnion cross of the type described above by essentially cylindrically-shaped throttle inserts, and a thread provided on the outer circumference of each throttle insert so as to form a through passage.

The throttle insert in accordance with the present invention has the advantage that the pressure reduction is not effected by openings having very small cross-sectional areas, but by a long throttling path formed by the thread on the circumference of the throttle insert. The throttle insert according to the present invention makes it possible to reduce the lubricant pressure existing in the center of the trunnion cross during the lubricating procedure from more than 100 bar to approximately 10 to 20 bar.

As a result of this pressure reduction, the sealing members of the bearings are not excessively stressed and cannot be turned inside out in extreme cases. When a plug of hardening lubricant is formed in one of the throughbores of the trunnion cross behind the throttle insert and, thus, the flow velocity of the lubricant through the throttle passage is reduced to zero, the throttling effect and the above-described pressure reduction are no longer effective, so that the full lubricating pressure is built up behind the throttle insert, which lubricating pressure is capable of forcing the plug out of the throughbore.

The throttle insert constructed in accordance with the present invention has the particular advantage that the cross-sectional area of tee throttle passage can be made larger than the cross-sectional area of the lubricant supply duct, i.e., generally the inlet bore of a lubricating nipple. As a result, it can be safely prevented that dirt particles having such a size that they could clog the throttle passages can penetrate into the trunnion cross with the lubricant.

In accordance with a possible embodiment of the present invention, the thread formed on the throttle insert is a sharp or angular thread.

This embodiment makes possible a particularly economical manufacture of the throttle inserts because, if the throughbores are of the appropriate size, the throttle inserts may be made of portions of threaded rods.

In accordance with another advantageous embodiment of the invention, the thread formed on each throttle insert is a trapezoidal thread.

A trapezoidal thread provides a relatively large cross-sectional area for the throttle passage, so that it is virtually impossible that the passage will be clogged by dirt particles.

In accordance with an advantageous further development of the invention, the throttle inserts each have an axially extending blind-end bore. Such a blind end bore improves the radial resilience of the throttle inserts, so that during manufacture of the inserts it is not necessary to adhere to particularly narrow tolerances.

In accordance with another advantageous feature of the invention, the throttle inserts are made of plastics material.

The use of plastics material for the throttle inserts means that the inserts are made of an inexpensive material and have a low weight.

In accordance with another significant embodiment of the invention, the throttle inserts may be made of a tube which is closed at one end by a plug, wherein the thread is provided on the outer circumference of the tube.

In this embodiment utilizing a tube, it is unnecessary to drill bores into solid throttle inserts in order to improve the radial resiliency thereof.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
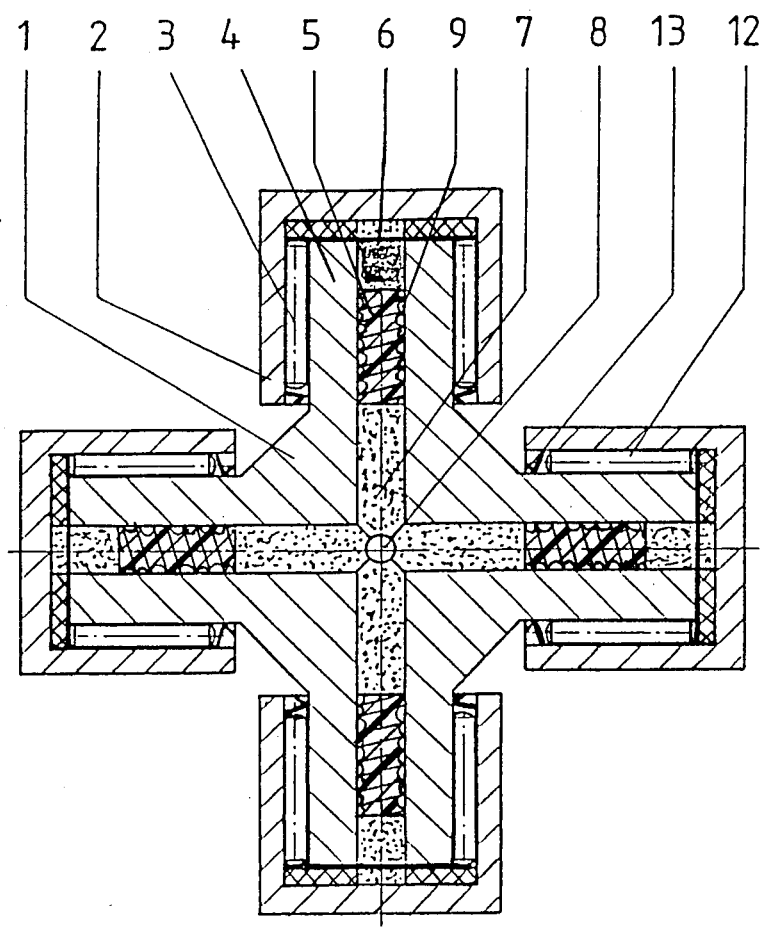
FIG. 1 is a cross-sectional view of a trunnion cross according to the present invention.
Figure 7:
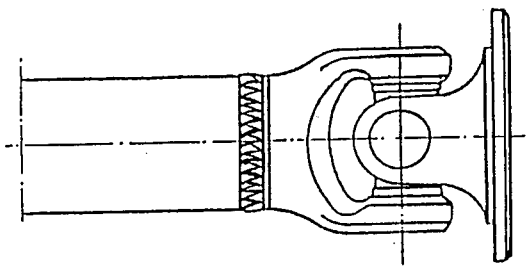
FIG. 7 is a schematic view of two yokes formed by a trunnion cross.

A trunnion cross 1 illustrated in a cross-sectional view in FIG. 1 defines two throughbores 7 extending concentrically through trunnions 4. The axes of the throughbores 7 extend perpendicularly to each other. The four trunnions 4 of the trunnion cross 1 carry needle bearings composed of needles 3 and bearing cups 2. The needle bearings ensure the rotatability of the trunnion cross 1 within two yokes, schematically illustrated in FIG. 7.

Figure 6:
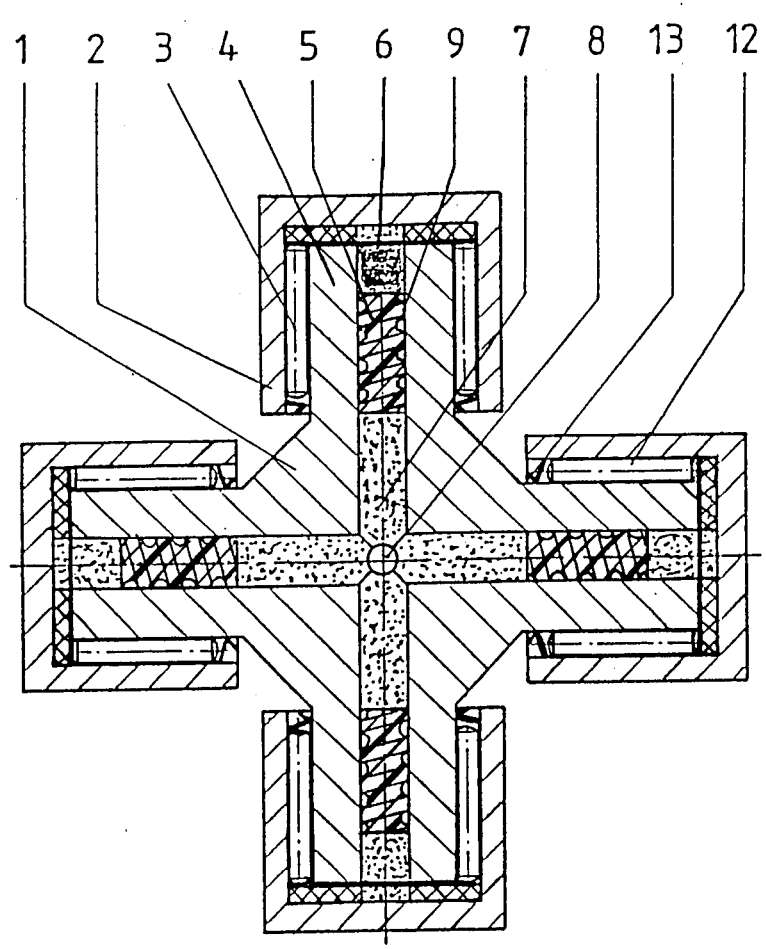
FIG. 6 is a cross-sectional view, as in FIG. 1, of another embodiment of the invention.

Throttle inserts 5 are inserted in a press fit into the throughbores 7 at the openings thereof in the region of the needle bearings. Each of the throttle inserts 5 is provided on its outer circumference a thread 9 which forms a throttle passage. The thread 9 may be a sharp thread, as shown in FIG. 1, or a trapezoidal thread, as shown in FIG. 6.

Lubricant is supplied to the trunnion cross through a feed bore 8 in the central portion of the throughbores 7. Thus, the central portion of the throughbores 7 forms a lubricant reservoir.

Lubricant is supplied to the needle bearings 12 through the throttle passages formed by the threads on the throttle inserts. When lubrication is effected under normal conditions, the lubricant pressure is reduced approximately by a ratio of 10:1. In addition to reducing the wear on the sealing members 13 provided for sealing the needle bearings, the throttle inserts 5 ensure a uniform distribution of the lubricant. In particular, this uniform distribution is independent of the condition of each individual sealing member.

As soon as during the use of the trunnion cross 1 a plug 6 of hardened lubricant is formed in one of the throughbores 7, the flow velocity of the lubricant in the respective throttle passage is zero. Thus, the high lubricant pressure prevalent in the central region of the throughbore 7 is not being throttled in the respective throttle passage, so that the full pressure exerted by the lubricant press can act on the plug 6 and can force this plug 6 out of the throughbore 7. As a result, the lubrication of the respective needle bearing valve is again possible.

Figure 2:
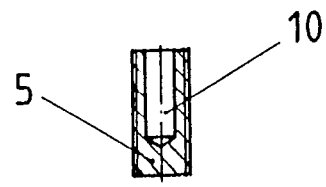
FIG. 2 is a sectional view of a throttle insert having an axial bore.

FIG. 2 of the drawing is a cross-sectional view of a throttle insert 5 which is provided with a blind-end bore 10. The blind-end bore 10 improves the radial resiliency of the throttle insert 5.

Figure 3:
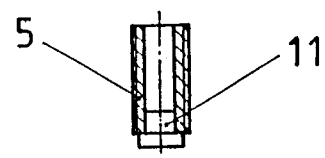
FIG. 3 is sectional view of a throttle insert including a tube and a plug.

FIG. 3 is a cross-sectional view of a throttle insert 5 made of a tube, wherein a plug 11 is provided for sealing the tube.

Figure 4:
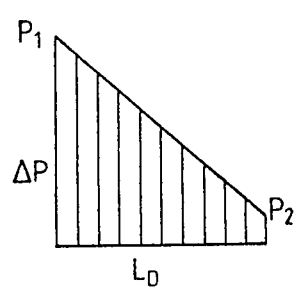
FIG. 4 is a diagram illustrating the pressure distribution within the throttle passage of an insert over the unrolled length of the passage when lubricants can flow freely through the passage.

FIG. 4 of the drawing is a diagram illustrating the pressure drop due to the throttling effect in dependency of the length of the throttle passage $L_D$.

Figure 5:
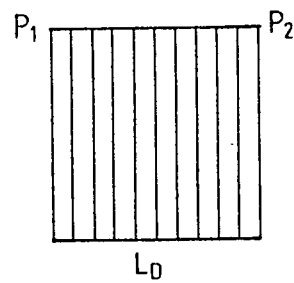
FIG. 5 is a diagram illustrating the pressure distribution within the throttle passage when the flow of lubricant ia blocked behind the throttle insert.

FIG. 5 is a diagram showing the pressure distribution over the length of the throttle passage when a plug 6 clogs the throughbore 7.

While specific embodiments of the invention have been shown and described in detail to illustrate the application of the inventive principles, it will be understood that the invention may be embodied otherwise without departing from such principles.

I claim:

1. A trunnion cross for connecting two yokes, each yoke defining a pair of eyes receiving a roller bearing, the trunnion cross comprising two pairs of trunnions, the trunnions of each pair of trunnions located diametrically opposite each other and each pair of trunnions defining an axis, the two axes of the trunnions extending perpendicularly to each other, each trunnion adapted for mounting in one of the roller bearings, the trunnion cross defining two throughbores extending in the directions of the two axes, cylindrical throttle inserts inserted with a press fit in the throughbores for pressure reduction, and a thread formed on the outer circumference of each throttle insert defining a throttle passage.

2. The trunnion cross according to claim 1, wherein the thread is a sharp thread.

3. The trunnion cross according to claim 1, wherein the thread is a trapezoidal thread.

4. The trunnion cross according to claim 1, wherein each throttle insert defines an axially extending blind-end bore.

5. The trunnion cross according to claim 1, wherein the throttle inserts are made of plastics material.

6. The trunnion cross according to claim 1, wherein each throttle insert is a tubular member, a plug being provided for closing one of the ends of the tubular member.

* * * * *